United States Patent [19]

Yoshimura et al.

[11] Patent Number: 4,459,019

[45] Date of Patent: Jul. 10, 1984

[54] AUTOMATIC SHEET ORIGINAL HANDLING DEVICE

[75] Inventors: Shigeru Yoshimura, Yokohama; Kimiaki Hayakawa, Tokyo; Akihiro Nomura, Kawasaki, all of Japan

[73] Assignee: Canon Kabushiki Kaisha, Tokyo, Japan

[21] Appl. No.: 441,063

[22] Filed: Nov. 12, 1982

Related U.S. Application Data

[63] Continuation of Ser. No. 197,616, Oct. 16, 1980, abandoned.

[30] Foreign Application Priority Data

| | | |
|---|---|---|
| Oct. 25, 1979 [JP] | Japan | 54-138094 |
| Oct. 25, 1979 [JP] | Japan | 54-138095 |
| Oct. 25, 1979 [JP] | Japan | 54-138096 |
| Oct. 29, 1979 [JP] | Japan | 54-139512 |
| Oct. 29, 1979 [JP] | Japan | 54-139513 |

[51] Int. Cl.³ .............................................. G03B 27/62
[52] U.S. Cl. ..................................................... 355/75
[58] Field of Search ..................................... 355/75, 76

[56] References Cited

U.S. PATENT DOCUMENTS

| | | | |
|---|---|---|---|
| 3,677,643 | 7/1972 | Sagawa | 355/76 |
| 3,936,041 | 2/1976 | Shiina et al. | 355/75 |
| 4,033,694 | 7/1977 | Ferrari | 355/76 |

*Primary Examiner*—Monroe H. Hayes
*Attorney, Agent, or Firm*—Fitzpatrick, Cella, Harper & Scinto

[57] ABSTRACT

An automatic sheet original handling device comprises an original supporting member on which originals to be conveyed to an exposure station are piled, an original supporting glass plate for supporting the originals conveyed from the original supporting member for exposure, original conveying means for conveying the originals from the original supporting member to the original supporting glass plate, a reflecting plate having a concavo-convex surface having an angle of inclination of 120° or greater and provided as near as possible to the back side of the original on the original supporting glass plate, and an original receiving member in which the originals conveyed and discharged from the original supporting glass plate by the original conveying means can be contained and piled.

6 Claims, 6 Drawing Figures

AUTOMATIC SHEET ORIGINAL HANDLING DEVICE

This is a continuation, of application Ser. No. 197,616, filed Oct. 19, 1980, now abandoned.

BACKGROUND OF THE INVENTION

1. Field of the Invention

This invention relates to an automatic sheet original handling device for automatically feeding originals from an original laying table on which sheet originals are piled through an original exposure station and discharging the originals to an original receiving portion.

2. Description of the Prior Art

In such an automatic sheet original handling device for automatically conveying sheet originals, particularly in the case where thin originals are handled, a white reflecting plate may be disposed on the back side so as to prevent the back side of the originals from being copied, whereas this reflecting plate cannot be made completely flat, but for example, in a device using a pawl as the means for positioning originals, a reflecting plate which is partly white at the fore end thereof is disposed as near as possible to an original for the purpose of preventing distortion of the original by the stopper of the pawl and this leads to the formation of concavo-convexity of the reflecting plate which in turn leads to creation of the shadow of such concavo-convexity. Further, if there is a gap between a thin original and a reflecting plate having a white back side, the gap will form a shadow which will be copied on copy paper. Still further, in a device which is provided with an original detecting sensor, a sensor window for passing light therethrough is formed in the white reflecting plate and if this window is left open, the window will be copied on copy paper in case of a thin original.

Also, in such an automatic sheet original handling device for automatically conveying sheet originals which is of the type in which, particularly in case of a thin original, the original is stopped by the fore end of the pawl when the conveyance force is strong, the portion of the leading end of the sheet original which bears against the pawl is distorted to create image strain. To prevent this, various contrivances have been devised such as stopping the original at a place short of the pawl or once letting the original go beyond the pawl and then returning it, whereas these have been inaccurate or costly if accurate. On the other hand, if the conveyance force is weakened, it will cause unsatisfactory discharge in case of thick originals and this means a disadvantage that the conveyance force cannot be weakened during discharge.

SUMMARY OF THE INVENTION

It is a primary object of the present invention to provide a novel automatic sheet original handling device which overcomes the above-noted various disadvantages.

It is another object of the present invention to provide an automatic sheet original handling device which prevents the influence of the white reflecting plate disposed on the back side of the original in the original exposure station or the creation of the shadow of the sensor window.

It is still another object of the present invention to provide an automatic sheet original handling device which prevents the creation of a shadow on copy paper even in the case of thin originals.

It is yet another object of the present invention to provide an automatic sheet original handling device in which the pressure contact between a conveyor belt and an original is adjusted during the arrival and the discharge of the original to effect stable feeding of the original.

It is a further object of the present invention to provide an automatic sheet original handling device which is inexpensive and which causes no image strain.

The main construction which can achieve the above objects of the present invention is an automatic sheet original handling device in which, on the back side of the original in the original exposure station, a white reflecting plate having a concavo-convex surface is disposed as near as possible to the surface of the original and this reflecting plate is of such a shape that the shadow of the concavo-convexity thereof is not created.

The other constructions of the present invention will become apparent from the following detailed description of embodiments of the invention taken in conjunction with the accompanying drawings.

DESCRIPTION OF THE PREFERRED EMBODIMENTS

Figure 1:
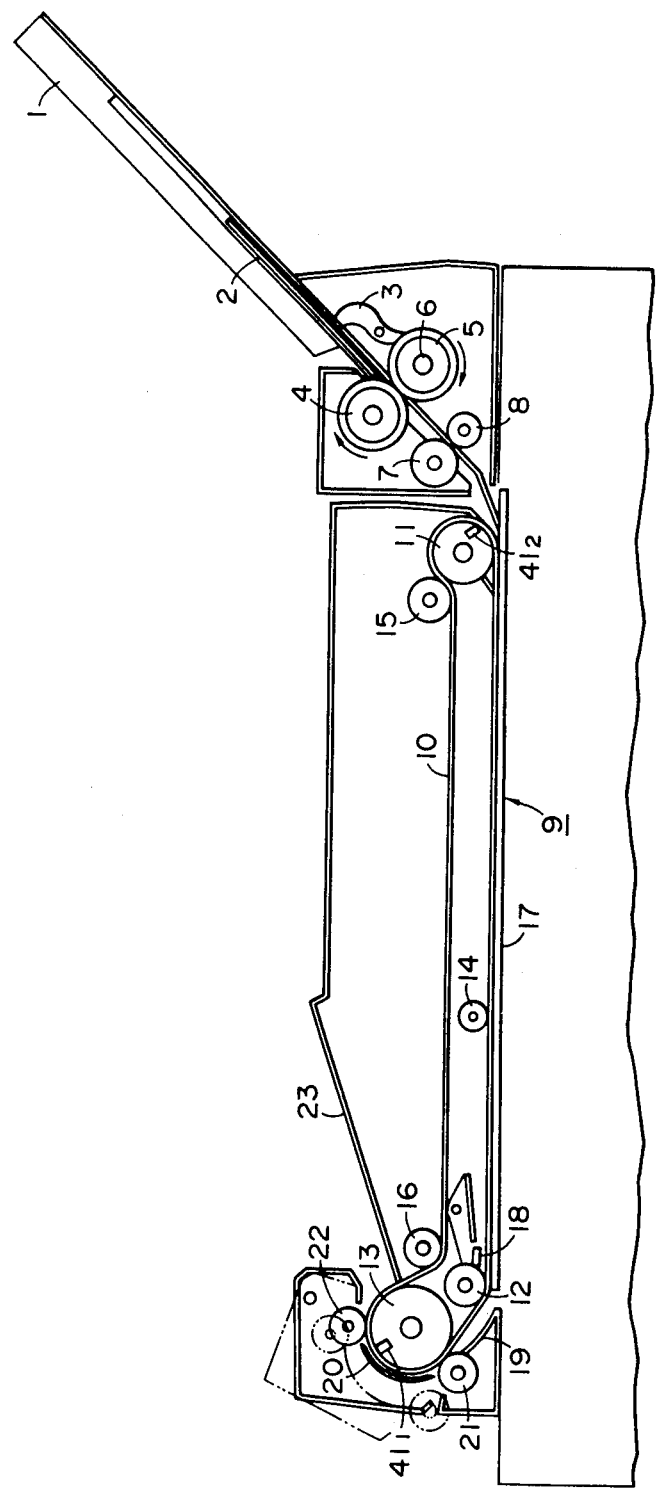
FIG. 1 is a cross-sectional view of an automatic sheet original handling device to which the present invention is applicable.

FIG. 1 is a cross-sectional view showing one embodiment of the automatic sheet original handling device according to the present invention. In FIG. 1, reference numeral 1 designates a sheet original laying plate on which sheet originals may be piled. In the shown example, sheet originals 2 on the sheet original laying plate 1 are piled with their front surfaces facing downwardly, and below the sheet original laying plate, an oscillating plate 3 is disposed for vertical oscillation to make the sheet originals 2 separable one by one. The oscillating movement may be transmitted by a cam or the like fixedly provided on a separating shaft 6 which will later be described. Forwardly of the sheet original laying plate 1 inclined in the original feeding direction, there are disposed a feed roller 4 for separating and feeding the sheet originals one by one and a separating roller 5 fixed to the separating shaft 6, and the feed roller 4 is controlled so as to be rotated in the original feeding direction while the separating roller 5 is controlled so as to be rotated in the opposite direction, thereby preventing two or more originals 2 from being fed at a time. An original fed by the feed roller 4 passes between conveyor rollers 7 and 8 and is conveyed thereby to an exposure station 9. Above the exposure station 9, a conveyor belt 10 is passed over rollers 11, 12, 13 and 14 in an endless form and is movable around the rollers, and the tension of the conveyor belt 10 is secured by tension rollers 15 and 16. The conveyor belt 10 is in contact, for example, with the original supporting glass 17 of the exposure station 9, and the original 2 is conveyed while being held between the conveyor belt 10 and the original supporting glass 17. When the original arrives at an adjustment position which is a predetermined position for predetermined copying, the original is once stopped by operation of a stopper 18 and the conveyor belt 10 is also once stopped from moving round.

Subsequently, the exposure scanning stroke of the copying machine is effected and when it is completed, the conveyor belt 10 starts to move around again and transports the original 2 on the exposure station. Accordingly, the original 2 passes between a guide 19 and the conveyor belt 10 and further between a roller 21 and a guide 20 and between a roller 22 and the conveyor belt 10 and is discharged onto an original receiving tray 23.

Now, the original 2 is conveyed while being held between the conveyor belt 10 and the original supporting glass 17, and is detected by an original detecting sensor located about 20 mm short of the stopper 18. This detecting sensor is provided on a white reflecting plate lying on the upper surface of the belt and the white reflecting plate is formed with a -shaped window and if this window is left open and if the original is a thin original or an original of high transmissivity, the -shaped window will be copied on copy paper. Therefore, according to the present invention, a shutter for closing this window during exposure is provided so that the -shaped window is not copied on copy paper.

Figure 2:
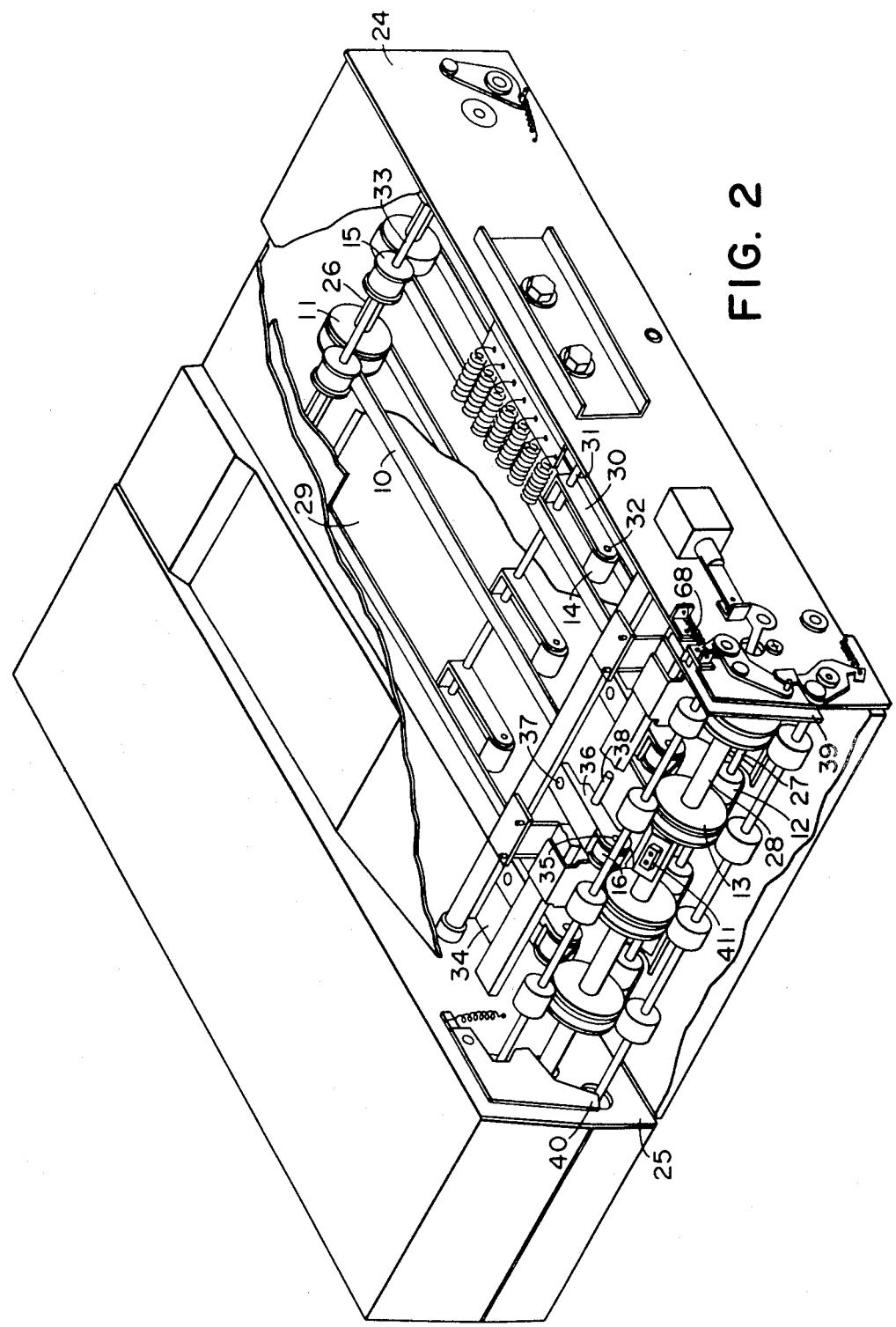
FIG. 2 is a perspective view of the device.

Reference is now had to FIG. 2 which is a perspective view of the internal mechanism of the embodiment of the automatic sheet original handling device according to the present invention. In FIG. 2, reference numerals 24 and 25 designate the front side plate and the back side plate of the device. Rollers 11, 12 and 13 are secured to roller shafts 26, 27 and 28, respectively, rotatably mounted between the front side plate 24 and the back side plate 25, and the endless conveyor belt 10 is passed over these rollers. A white reflecting plate 29 is disposed inside of the conveyor belt 10 and the surface thereof facing the original supporting glass 17 is preferably painted in white so that there is no impediment to the original scanning and copying stroke of the copying machine. A roller support 30 is rotatably mounted on a support shaft 31 secured to the front side plate 24 and the back side plate 25, and the roller 14 is rotatably mounted on a roller shaft 32 mounted on one end of the roller support 30 so that the conveyor belt 10 is moved around with its contact with the original supporting glass 17 being sufficiently ensured by gravity. The conveyor belt 10 is desirably white. The tension roller 15 is securely provided on a tension shaft 33 rotatably mounted to the front side plate 24 and the back side plate 25. The other tension roller 16 is designed such that it can adjust the tension of the conveyor belt 10. That is, a fixed plate 34 is fixedly mounted to the front side plate 24 and the back side plate 25, and a tension support 36 having the tension roller 16 rotatably held on one end thereof through a tension shaft 35 is movably mounted on the fixed plate 34 by an adjust screw 37.

An adust bar 38 for adjusting the distance between the fixed plate 34 and the tension support 36 is mounted on a part of the fixed plate 34 and the tension support 36. Accordingly, adjustment of the tension of the conveyor belt 10 may be accomplished by holding down the adjust bar 38 to thereby impart a tension to the conveyor belt 10 and turning the adjust screw 37 to thereby separate the tension support 36 from the fixed plate 34. Both of the tension rollers 15 and 16 are flanged on the opposite sides thereof to prevent the conveyor roller 10 from slipping off. Further, an intermediate front side plate 39 and an intermediate back side plate 40 pivotable so as to be released from the front side plate 24 and the back side plate 25 are provided inside of the front side plate 24 and the back side plate 25, respectively, and the guide 20 is secured thereto so that these are moved together. At a position near the upper portion of the guide 20 and capable of detecting the original, an abnormality detecting sensor $41_1$ is mounted to detect abnormal conveyance of the original. For example, the size of the original is detected in advance by another sensor $41_2$ (shown in FIG. 1), that is, the leading end and the trailing end of the original are detected to thereby detect the passage time thereof and, when the abnormality detecting sensor $41_1$ has detected a passage time longer than said passage time, the conveyance of the original may be stopped and the restraint of the original may be released.

Figure 3:
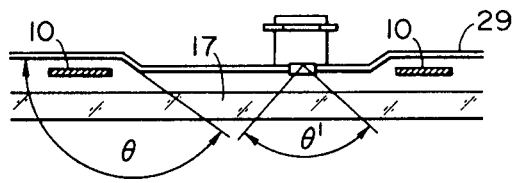
FIG. 3 is a fragmentary sectional view showing the configuration of a reflecting plate.

In such an automatic sheet original handling device, the white reflecting plate 29 has a concavo-convex surface so that it is as near as possible to the surface of the original and according to the present invention, this reflecting plate is formed into such a shape that the shadow by the concavo-convexity is not created. FIG. 3 shows such a shape. As shown, the white reflecting plate 29 is embossed near the pawl to eliminate image strain. However, such a shape will cause creation of a shadow. Nevertheless, in the present invention, it has been found that if the angle $\theta$ of embossing is $\theta \geq 120°$, there is created no shadow. Also, even in an arrangement wherein the white reflecting plate 29 is caulked to provide a support shaft, creation of a shadow can be prevented by selecting the angle $\theta'$ of caulking to 120° or greater.

Thus, in the present invention, even if a white reflecting plate having a concavo-convex surface is disposed on the back side of the original in the original exposure station, the influence of the concavo-convex surface of this reflecting plate can be eliminated to prevent a shadow from being created on copy paper.

Figure 4:
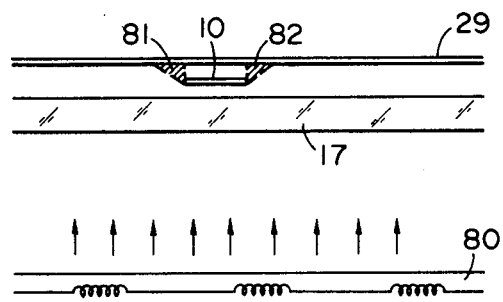
FIG. 4 is a fragmentary sectional view illustrating the creation of shadow.

Reference is now had to FIG. 4 to describe a case where the transmissivity of the conveyor belt 10 is 0 and a case where the transmissivity of the conveyor belt 10 is 40% or greater which has provided a preferable experimental result. If a completely parallel light is obtained, it is evident that it has no relation to the transmissivity of the conveyor belt, but in the case of an illuminating system such as a halogen lamp 80 as shown wherein homogeneous exposure is provided by synthesis, if there is a gap between the white reflecting plate 29 and the belt 10, a shadow will be inevitably created at portions indicated by 81, 82 when the transmissivity is 0. Therefore, when the transmissivity of the belt is increased to provide a transparent belt, there is created no shadow. However, from various limitations, a transparent belt is difficult to use and therefore, when an experiment has been carried out as to what degree of transmissivity of the belt is suitable, it has been found that a shadow is not liable to occur for the transmissivity of 40% or greater.

Figure 5:
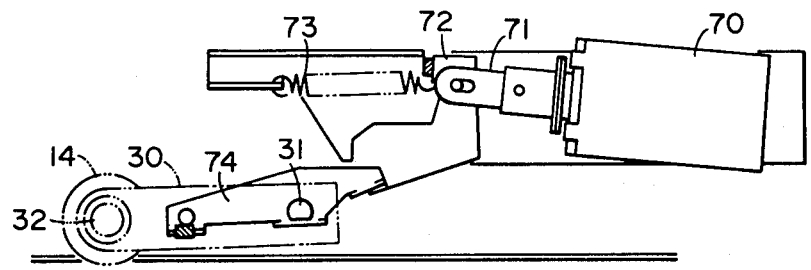
FIG. 5 is a fragmentary sectional view of a weight control portion.

Reference is not had to FIG. 5 to describe a mechanism which does not operate when an original is directed to a stop position but operates to urge an original against the conveyor belt to thereby increase the conveying force only when the original is discharged after exposed. In the example shown in FIG. 5, means for urging the original against the conveyor belt comprises a weight roller 14 which is controlled by a plunger 70. In this construction, the weight roller 14 is supported on a roller shaft 32 mounted on one end of a roller support 30, which is engaged with a driver 74 mounted on a support shaft 31. There is provided a driving plate 72 mounted on the plunger link 71 of the plunger 70.

When paper is being discharged, the mechanism assumes the position shown in FIG. 5 wherein the plunger 70 is in its attracting condition and the plunger link 71 moves rightwardly to rotate the driving plate 72 clockwisely and the driver 74 supported on the shaft 31 is rotated counterclockwisely, so that the weight becomes free to be exerted. During paper feed, the mechanism acts reversely and the weight becomes inactive.

As described above, the present invention does not operate when an original is directed to the stop position, but it increases the conveyance force only when the original is discharged after the exposure thereof and therefore, even when thin originals are handled, there is created no image strain of the leading end of a sheet original and also, during the discharge of thick originals, a sufficiently great conveyance force is provided to ensure stable feeding of both thin originals and thick originals.

Figure 6:
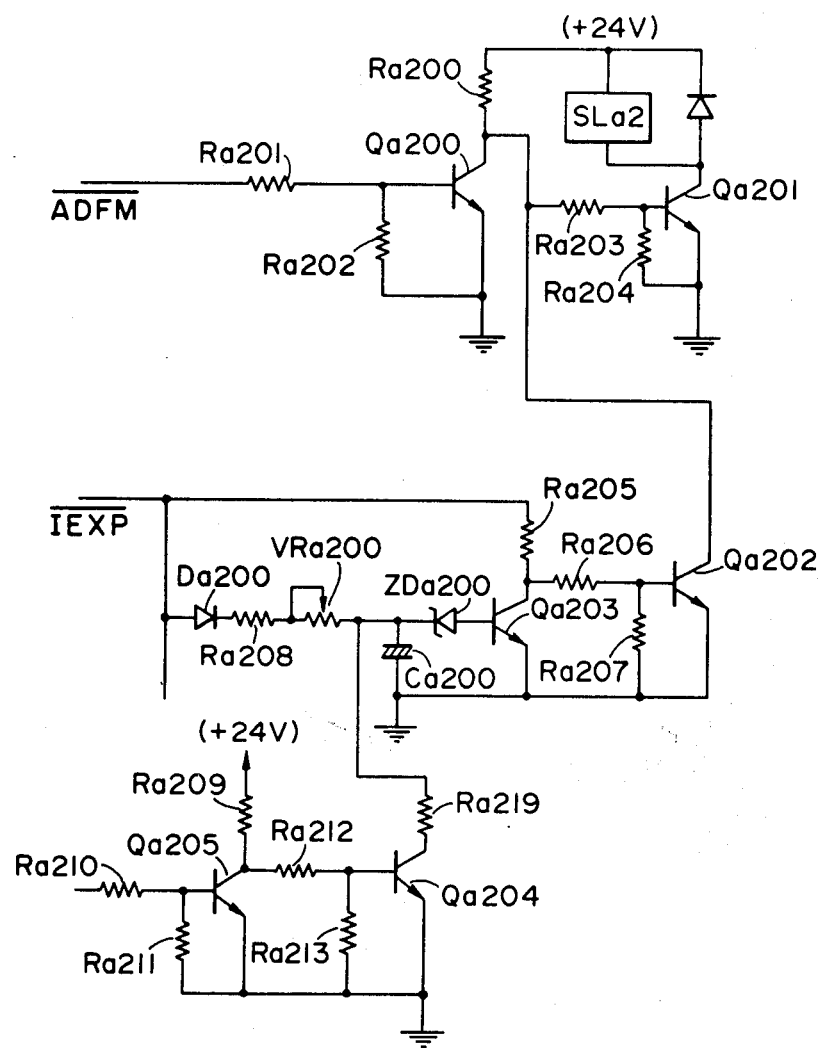
FIG. 6 is a diagram of a shutter control circuit.

Reference is now had to FIG. 6 to describe a control circuit for a shutter which covers the sensor window. The control of this shutter can be considered with respect to the book mode, namely, the case where copying is effected with an original placed on the original supporting table, and the sheet mode, namely, the case where copying is effected while sheet originals are automatically fed. In FIG. 6, Qa designates a transistor, Ra denotes a resistor, Da designates a diode, ZDa denotes a Zener diode, and SLa designates a shutter solenoid. In the book mode, the mode signal $\overline{\text{ADFM}}$ of ADF is "H" and therefore, a transistor Qa200 is turned on, a transistor Qa201 is turned off, a shutter solenoid SLa2 becomes deenergized and the shutter is closed.

The mode signal of ADF refers to the ADF mode condition, namely, the sheet mode condition, if ADFM is High, and $\overline{\text{ADFM}}$ shows the reverse logic condition of ADFM, that is, $\overline{\text{ADFM}}$ shows the Low condition if ADFM is High. That is, it is the sheet mode condition.

Next, consider the ADF mode, namely, the case where the switch of ADF is on and the original illuminating lamp is not turned on. Since the mode signal $\overline{\text{ADFM}}$ of ADF is "L," the transistor Qa200 is on, and since a lamp-on signal IEXP for the power source regulator of the body is "L", transistor Qa202 is turned off and transistor Qa201 is turned on and accordingly, the shutter solenoid SLa2 becomes energized and thus, the shutter is opened. When the original illuminating lamp is turned on in the ADF mode, the transistor $Q_a200$ is turned off because the ADF mode signal $\overline{\text{ADFM}}$ is "L", and transistor Qa205 is turned on and transistor Qa204 is turned off because the power source regulator IEXP is "H". At this time, a capacitor Ca200 starts to be charged, transistor Qa203 is turned off, transistor Qa202 is turned on, and transistor Qa201 is turned off, so that shutter solenoid SLa2 becomes deenergized and the shutter is closed. When about 0.8 second elapses, the base potential of transistor Qa203 becomes "H" due to the charging and transistor Qa202 is turned off and transistor Qa201 is turned on, so that shutter solenoid SLa2 becomes energized and the shutter is opened.

According to the present invention, as has been described above, the window formed in the white reflecting plate disposed on the back side of the original in the original exposure station is covered by the shutter when required and thus, the shadow of this window is prevented from being copied on copy paper.

What we claim is:

1. An automatic sheet original handling device, comprising:
    an orginal placing member for placing thereon a sheet original to be fed to an exposure station;
    a transparent plate for carrying the original fed from said original placing member;
    feeding means for feeding the original from said original placing member to said transparent plate;
    stopper means adapted to be contacted by the leading edge of the original fed by said feeding means for thus stopping the original at a predetermined position on said transparent plate;
    a reflecting plate constructed and arranged with a portion projecting at an angle which is not less than 120°, as viewed from the stopper means side, toward said transparent plate only at a position adjacent to and upstream of said stopper means with respect to the direction of original movement for minimizing the clearance between said transparent and reflecting plates only at such position to avoid deformation of the leading edge of the original; and
    a receiving member for receiving the sheet originals discharged from said transparent plate.

2. An automatic sheet original handling device according to claim 1, further comprising urging means inoperative when an original is directed to the stop position on said transparent plate and which urges an original against said original feeding means to increase the conveyance force when the original is discharged into said receiving member after exposure.

3. An automatic sheet original handling device according to claim 2, wherein said urging means is a weight roller.

4. An automatic sheet original handling device according to claim 1, wherein said feeding means includes a conveyor belt, and said conveyor belt is transmissive so that no shadow due to its thickness is created.

5. An automatic sheet original handling device according to claim 1, wherein said stopper means includes an original stopping pawl adapted to be released immediately after the stoppage of said original feeding means.

6. An automatic sheet original handling device according to claim 1, wherein said reflecting plate is formed with a sensor window, and a shutter member provided in said window for covering said sensor window when necessary.

* * * * *